3,406,149
POLYSULFONES AND PROCESS FOR MAKING
Herward A. Vogel, Oakdale Township, Washington County, Minn., assignor to Minnesota Mining and Manufacturing Company, St. Paul, Minn., a corporation of Delaware
No Drawing. Filed Sept. 17, 1964, Ser. No. 397,295
6 Claims. (Cl. 260—49)

ABSTRACT OF THE DISCLOSURE

Thermoplastic polymers having good thermal stability and relatively high melting point which are permanently and non-extractably colored to any desired color or strength of color are produced by incorporating colored aromatic dye moieties derived from an aromatic dye system free from Zerewitinoff-active hydrogen as comonomers into the backbone of polyarylsulfone polymers. The dye moieties are coupled to the aromatic polymer moieties by —SO$_2$— linking groups connecting aromatic rings of the dye moieties with aromatic nuclei of the polyarylsulfone and form part of the backbone of the polymer.

---

This invention relates to thermoplastic polymers and more particularly to polyarylsulfones.

Polyarylsulfones are colorless to somewhat yellow thermoplastic materials which have limited solubility. When they are of high molecular weight so that films and fibers can be produced from them, they are even less soluble, and therefore it is difficult to dye such films or fibers using the conveniently available processes. While pigments may be incorporated into the melted material prior to extrusion, this increases the melt viscosity and produces opaque articles. Furthermore, granular pigments may have an adverse effect upon the strength of the films or fibers themselves.

It is an object of this invention to produce polyarylsulfone polymers which contain dyes incorporated into the polymer chain.

It is a further object of this invention to provide polyarylsulfone polymers which have improved resistance to the effect of ultraviolet radiation.

Other objects will be apparent from the disclosures hereinafter made.

In accordance with the above and other objects, I have found that polyarylsulfones, including high molecular weight polymers, can be produced having the most varied, predetermined colors by the condensation of aromatic disulfonyl halides with small amounts of certain aromatic dyestuffs. The polymers thus produced have dye molecules incorporated into their chains or backbones, and are more or less strongly colored, depending upon the amount of dye employed. Thus, the colored moiety is actually part of the polymer chain, and cannot be removed from the polymer by solvent extraction or the like.

Alternatively, a chlorosulfonated dye can be employed, which in the presence of a catalyst reacts with aromatic hydrocarbons.

The polymers produced in this way are colored and thermoplastic, and can be converted to sheets, films, fibers, filaments, rods, etc. by usual procedures of forming thermoplastic polymers. They are much more resistant to weathering than films and fibers made from the same polymers not containing such dyestuffs. Surprisingly, it has also been found that such colored polymers have improved adhesion properties.

The polymers of the invention can be characterized as thermoplastic polymers consisting essentially of aromatic nuclei linked by divalent linking groups of the class consisting of —O— and —SO$_2$—, and containing at least enough of a colored aromatic moiety in the backbone, derived from a dye containing aromatic nuclei, to produce a visibly colored polymer. These polymers consist essentially of repeating units of the formula

wherein R is an aromatic nucleus, R' is the divalent residue of an aromatic nucleus-containing Zerewitinoff-active hydrogen-free dye, $n$ is a number from 50 to about 5000 and $m$ is a number from 1 to about 10.

The aryl moiety R of the foregoing formula contains rings which are free from hetero nitrogen atoms and nitrogen-containing substituents. Such aryl moieties useful in the polymers of the invention include benzene, biphenyl, naphthalene, anthracene, diphenyl methane, diphenyl ether, diphenyl sulfide and the like; as well as those of the formula

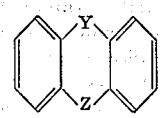

wherein Y is a member of the group consisting of —O—, —S— and a carbon-carbon valence bond and Z is a member of the group consisting of —O—, —S— and —CH$_2$—. Moieties exemplified by the latter formula include xanthene, dibenzodioxin, fluorene, dibenzofuran, thianthrene, dibenzothiophene, dibenzo-1,4-thioxane, thiazanthene and the like. These are included in monomers or comonomers which have one or two sulfonyl halide groups attached thereto, or are the hydrocarbons themselves.

Any of such monomers or comonomers can be further substituted with small non-reactive substituents on the aromatic nuclei. Thus, the aromatic nuclei may additionally bear alkyl or perfluoroalkyl groups, such as methyl, ethyl, propyl, hexyl and the like; lower alkoxy groups, such as methoxy, ethoxy, butoxy, etc.; halogen atoms, such as chlorine or bromine, or other similar small substituents which are inert under the conditions of the poly condensation reaction.

The dyestuff moiety R' is a residue obtained after reaction of two aromatic hydrogen atoms in the dye molecule with sulfonyl halide groups present on the R moiety; or, the entire unit —R'—SO$_2$— can be a moiety derived from a sulfonyl halide group-containing dye. These colored moieties can be selected from such dyes as aromatic vat dyes, their derivatives and homologues; including the indigoid and anthraquinonoid vat dyes; phthalocyanine-type dyes, and the like. The only requirement as to the dyestuff is that it be free from substituents containing active hydrogen, as determined by the method of Zerewitinoff, Ber. 40, 2026 (1907); J. Am. Chem. Soc. 49 2815 (1927). The dye must also contain aromatic hydrogen available for linking with sulfonyl halide.

Exemplary of such dyes are the following:

Anthraquinone 1,2-5,6-bis thioxanthone
1,8-dithiophenyl anthraquinone (Amaplast yellow)
1,8-diphenoxy anthraquinone
Diphthalyl dibenzdioxin
Diphthalyl phenoxthin
Pyranthrone
Dibenzanthrone
12,12'-dimethoxy benzanthrone
Anthanthrone
Triphendioxazine
Thioindigo
1,2-bis-naphtho thioinindigo
1,8-bis-naphtho thioindigo
2,3-bis-4-chloronaphtho thioindigo 6,6'-diethoxy thioindigo
7,7'-dichloro thioindigo
5,5'-dichloro thioindigo
Copper phthalocyanine
Monochloro copper phthalocyanine
1,2-naphthalocyanine
Tetraphenyl phthalocyanine
Color Index 70305 Vat Blue 7
Color Index 70100 Erweco Yellow
Color Index 67300 Vat Yellow 2
Copper phthalocyanine disulfonyl chloride
Thioindigo disulfonyl chloride
1,8-dithiophenyl anthraquinone disulfonyl chloride
Triphendioxazine disulfonyl chloride When the polymers of the invention are of high molecular weight, and have inherent viscosity not less than about 0.3, they are strong and tough and form tough, flexible, orientable films and filaments of excellent physical properties.

They can be extruded, drawn, oriented or otherwise formed into articles by conventional methods used to shape thermoplastic resins, without serious degradation; and the articles thus produced have a high degree of strength, toughness, flexibility and good appearance. They have excellent dielectric properties and retain these properties at high temperatures. By heating at a temperature below the melting point (i.e., annealing), or by orienting, crystallinity can be developed in a number of the polymers. They are permanently colored, as the dye cannot be removed from the polymer by solvent extraction or the like.

The polymers of the invention are thermoplastic and soften at relatively high temperatures. They melt at temperatures ranging from the order of 200° C. to above about 400° C. They are extremely stable, and can withstand temperatures of 400° C. or even higher without serious degradation.

The new polymers are soluble in concentration of 10 percent in phenol at 175° C. which indicates their substantially linear, non-crosslinked nature. They are also soluble in concentrated sulphuric acid and in N-methyl pyrrolidinone, producing stable solutions.

Additionally, many of the new polymers are soluble in such solvents as N,N-dimethyl formamide, dimethyl sulfoxide, pyridine and the like, some of them also being soluble in halogenated solvents such as methylene chloride. The solutions which result are in some instances useful for casting of films and spinning of fibers.

The stability of the polymers includes resistance to hydrolytic and oxidizing media. Thus, for example, the polymers may be recovered unchanged from their solution in concentrated sulphuric acid merely by dilution with water. Likewise, they can be heated under pressure in the presence of aqueous acids or bases without hydrolysis.

The toughness of thermoplastic materials is known to be an index of their utility for use as films or molded items. Toughness as a property can be measured by subjecting a film of polymer from 3 to 7 mils thick to repeated creasing by folding a strip of the film double and creasing, followed by refolding the film back upon itself on the same line and again creasing, as one cycle. The number of creasing cycles withstood by the film before breaking at the crease line is referred to as the "degree of toughness." Failure to withstand the initial creasing rates a degree of toughness of zero; if the film breaks on the second cycle, the degree of toughness is one, etc.

The heat resistance of a polymer can be determined by thermogravimetric analysis (often abbreviated to TGA), i.e., measuring the loss of weight of the polymer while heating to high temperature. For example, a useful test is provided by simultaneously heating up and weighing a 100 mg. sample of the polymer in a suitable oven, in air, from ambient temperatures to about 400–500° C., at the rate of 7° C. temperature increase per minute, to determine any weight loss. A weight loss of 5 percent or less in this test shows excellent stability of the polymer at the highest temperature used.

The polymers of the invention have various uses in numerous areas of application. They can be used to make films and fibers or molded articles in any desired shape, either alone or mixed with fillers, glass fibers and the like. They are usefully laminated with glass fibers or glass cloth. They can also be used as adhesives or coatings, to impregnate the surface of various materials or form a surface film thereon. They are useful as wire coatings, tubes, pipes, sheets and the like.

The polymers are particularly useful in applications where their high dielectric properties are of importance, as in electrical insulating materials, and particularly where severe and corrosive ambient conditions are found.

When the polymers of the invention are of lower molecular weight, they are nevertheless heat resistant and soluble in limited numbers of solvents. Although they are not so useful as the higher molecular weight materials for production of films and fibers, they can be ground to form molding powders or pigments. Pigments made in this way can be incorporated into suitable liquid vehicles to form excellent paints or enamels. These polymers are also useful structural adhesives, and coatings.

The processes for making polymers of this invention, broadly speaking, are carried out utilizing either melt condensation or solution condensation procedures, involving the repeated reaction between an aromatic sulfonylchloride group and an aromatic hydrogen atom by heating to a temperature in the range of about 100 to 250° C. in the presence of a condensation catalyst.

One process for producing the polymers in accordance with the invention consists in the condensation of certain difunctional monomers containing two sulfonyl halide groups and nucleus-containing dye compounds in the presence of Lewis acid catalysts. Because only relatively small amounts of dye molecules are required, even to produce rather intensely colored polymers, other comonomers are employed. These can be aromatic hydrocarbon compounds as shown here. In carrying out the reaction, the halogen on each of the aromatic sulfonyl halide groupings reacts with a hydrogen atom of the aromatic compound.

The reaction is more specifically illustrated by the following series of equations in which 1,8-dithiophenyl anthraquinone is representative of the useful dyes:

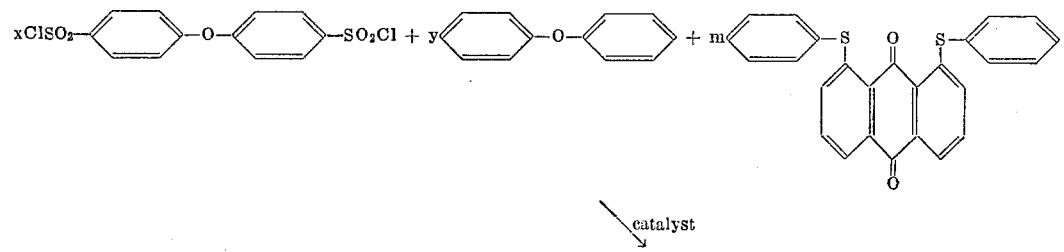

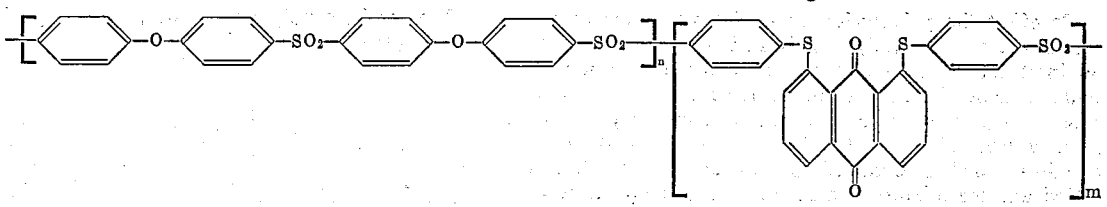

In this case $x+y$ equals $n$ in the formulae hereinabove. As in any polymer, the total chain length $n+m$ will be a number which is an average of the number of repeating units present in all of the polymer chains, which, of course, varies depending upon the conditions of polymerization.

In another aspect of the processes for producing polymers of the invention, prepolymers of relatively short chain length are made which are then condensed with dye molecules, as follows:

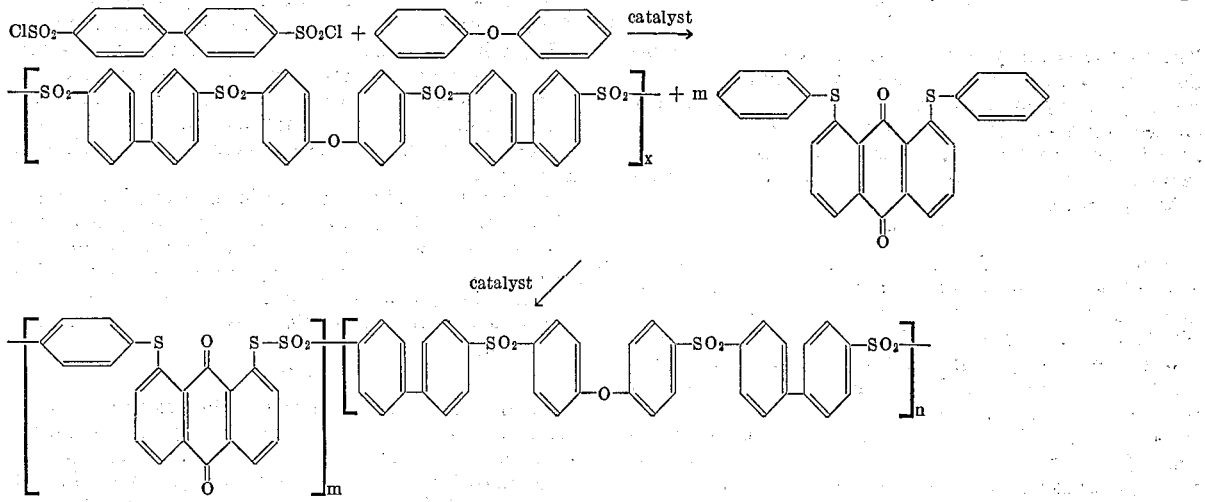

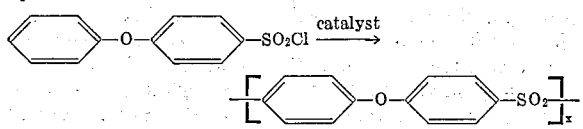

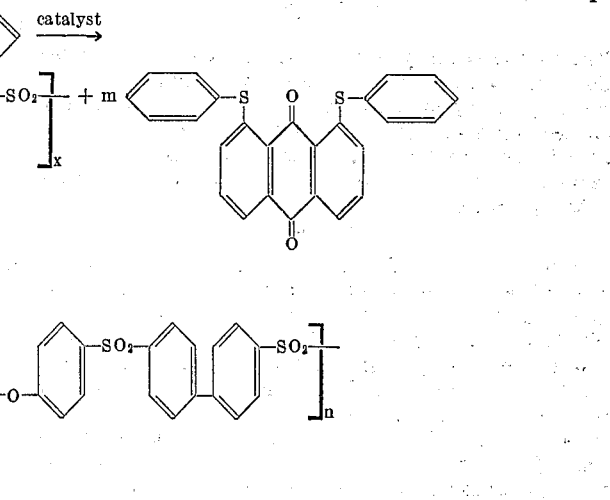

In these formulae $x$ is a small number, say about 10 to 100.

The prepolymers can also be produced by the use of monomers which are self-condensable, as illustrated by the reaction $x$ is a number of say from 10 to 100.

Likewise, a chlorosulfonated dye can be used to react with the hydrocarbon end group of a prepolymer to form the desired sulfone linkage.

As noted above, mixtures of comonomers can be employed as well as simple monomers; these can be varied to provide specifically desired properties in the basic polymers, which are then modified by the inclusion in the backbone of the dye moieties according to the invention.

Comonomers useful to produce homo- and copolymers are exemplified by p,p'-diphenyl ether disulfonyl chloride, p,p'-diphenyl methane disulfonyl chloride, p,p'-biphenyl disulfonyl chloride, 2,7-fluorene disulfonyl chloride, 2,8-dibenzofuran disulfonyl chloride, 2,7-naphthalene disulfonyl chloride, p,p'-diphenyl sulfide disulfonyl chloride, diphenyl ether, dibenzofuran, fluorene, diphenylene dioxide, naphthalene and the like.

Additional monomers of the type useful in the process as illustrated above are exemplified by p-diphenyl ether monosulfonyl chloride, naphthylphenyl ether monosulfonyl chloride and the like. Comonomers such as p-biphenyl mono-sulfonyl chloride, 2-fluorene sulfonyl chloride, 2-dibenzofuran sulfonyl chloride and 2-naphthalene sulfonyl chloride can be added to such monomers as p-diphenyl ether monosulfonyl chloride to change the ratio of —O— linking groups in the finished polymer.

The individual aromatic nuclei in the monomers useful in the process of the invention are carbocyclic, e.g., benzene or naphthalene and, as described above, they may be bonded together directly or through an ether linkage, a methylene group or other small linking groups, or a condensed ring system. Mixtures of monomers can be employed to form copolymers.

The underlying principle for the wide choice of operable monomers for the process appears to be the deactivating effect of the sulfonyl group on the aromatic ring to which it is or becomes attached. This deactivation is sufficient to prevent any significant amount of higher than monosulfone formation in any one ring. Branching and cross-linking are thus suppressed.

It is generally preferred to utilize an inert solvent in carrying out the polymerization process in order to increase the fluidity of the reaction mixture. The preferred solvents are chlorinated aliphatic and aromatic hydrocarbons, e.g., s-tetrachloroethane, methylene chloride and Arochlors (highly chlorinated biphenyl and diphenyl ether), etc., or aliphatic and aromatic sulfones such as dimethyl sulfone, tetramethylene sulfone, p,p'-dichlorodiphenyl sulfone, etc., or aliphatic and aromatic nitro compounds, such as 1-nitropropane, nitrobenzene, 3,4'-dichloronitrobenzene, etc.

Effective condensation catalysts are anhydrous Lewis acids, also known as Friedel-Crafts catalysts, such as ferric chloride, aluminum chloride, zinc chloride, antimony pentachloride, etc. Anhydrous hydrofluoric acid, or trifluoromethane sulfonic acid also may be used as catalysts.

The particularly preferred catalysts are salts and oxides of iron, such as ferric chloride, ferric bromide, ferric fluoride and ferric oxide. Ferrous chloride, ferric sulfate, ferroso-ferric oxide and the like also can be effectively utilized as catalysts. These are generally found to be effective in amount of from about 0.05 to about 0.5 mole percent, based on the amount of monomer present. Greater proportions of catalyst may be utilized but this is generally unnecessary and is ordinarily avoided, because larger amounts can adversely affect the degree of polymerization and the separation of the catalyst from the polymer may prove difficult.

To effect the polycondensation, the monomers or co-monomers are generally first heated in the presence of an inert solvent to a temperature sufficient to obtain a uniform melt. Commonly this is achieved at a temperature ranging from 100 to 200° C., although temperatures ranging from about 25 to 250° C. may be used. After a uniform melt is obtained the condensation catalyst is added and the mixture is maintained at a temperature in the range of from 100 to 250° C. for from about 1 hour to 20 hours, to complete the polymerization. High molecular weight polyarylsulfones are produced in good yields in this manner as is shown by the examples which will follow.

The following examples are intended to illustrate the present invention, but no limitations to the scope of the invention are implied. All parts are by weight, unless otherwise specified. Inherent viscosities of the polymers are determined in accordance with the following equation:

$$inh = \frac{ln\ \eta\ rel}{C}$$

The relative viscosity ($\eta$ rel) is determined by dividing the flow time in a capillary viscometer of a dilute solution of the polymer by the flow time for the pure solvent. The concentration (C) is 1.0 gram of polymer per 100 ml. of solution, and the measurements are made at a temperature of 25° C. in dimethyl formamide solution, unless otherwise noted.

Example 1

A mixture of 75.67 g. of phenyl ether disulfonylchloride, 34.04 g. of phenyl ether, 0.85 g. of 1,8-dithiophenyl anthraquinone (Amaplast Yellow GHS) and 92.2 g. of nitrobenzene is placed in a 500 ml. 3-neck flask fitted with a stirrer and nitrogen inlet and outlet. The air in the equipment is swept out with nitrogen and then a slow flow of nitrogen is routinely maintained. The flask is heated to 90° C. and 1.5 ml. of a 10 percent solution of anhydrous ferric chloride in nitrobenzene is injected to start the polymerization. The temperature is raised to 120° C. within 1 hour, and slow stirring of the reaction mixture under slow flow of nitrogen is continued at this temperature for 23 hours. The resulting viscous reaction mixture is diluted with 300 ml. of dimethyl formamide and precipitated by adding to a large volume of methanol using a high speed blender to stir the methanol. The precipitated polymer is extracted twice with a refluxing mixture of about 2 liters of equal parts of methanol and acetone to extract the catalyst and solvent, and dried.

The resulting yellow polymer contains repeating units of the formula

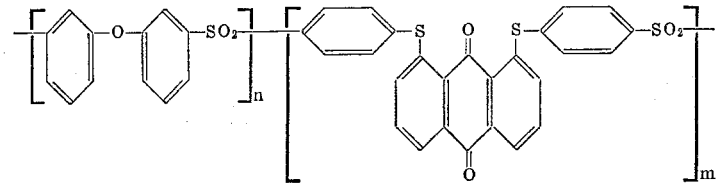

wherein $n$ is about 200 and $m$ is about 1. The inherent viscosity of the polymer thus prepared is about 0.42. Tough, transparent, golden yellow films are prepared from this polymer by either pressing between aluminum foil at about 320° C. or casting from a solution in dimethyl formamide and evaporating the solvent. The color is not solvent-extractable and is fast toward sunlight.

Example 2

A mixture of 74.55 g. of phenyl ether disulfonylchloride, 34.04 g. of phenyl ether and 0.30 g. of thioindigo is polymerized in solution in 92.2 g. of nitrobenzene, catalyzed by 150 mg. of ferric chloride under the same conditions and using the same work-up and extraction procedures as described in Example 1.

The resulting polymer is a deep magenta color, which contains the repeating units

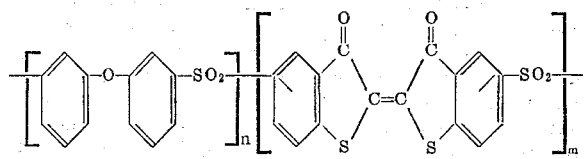

in which $n$ is about 400 and $m$ is about 1. The exact location of the connecting bonds to the dye moiety is not known. The inherent viscosity of the polymer (83 g.) is 0.44. Tough, transparent, magenta colored films are prepared from the polymer by either hot pressing or solution casting techniques.

Example 3

A mixture of 37.26 g. of phenyl ether disulfonylchloride, 17.02 g. of phenyl ether and 46 g. of nitrobenzene is heated to 90° C. under nitrogen sweep and with stirring. At this temperature 1 ml. of a 10 percent solution of ferric chloride in nitrobenzene is added to start the polymerization. After approximately 5 minutes, 100 mg. of copper phthalocyanine are added to the reaction mixture. The polymerization is then completed and the product is worked up under the same conditions as described in Example 2.

The resulting polymer is blue in color and is comprised of repeating units in which copper phthalocyanine moieties are interspersed between chains of phenyl ether sulfone repeating units in the backbone of the polymer. The polymer thus prepared has inherent viscosity of 0.57 and forms clear cyan-colored films when hot-pressed or cast from solution.

Example 4

Following the same general procedure as set forth in the preceding examples, a mixture of 25 g. of 4-biphenylsulfonylchloride, 20 g. of Arochlor-1248 (50 percent chlorinated biphenyl) and 0.5 g. of triphendioxazine sulfonyl chloride is heated in a flask to about 160° C. After a uniform melt has formed, 100 mg. of sublimed ferric chloride are added and heating is continued for about 20 hours at a temperature which gradually rises to about 230° C. A slow stream of nitrogen is passed over the reaction mixture during polymerization to carry off the hydrogen chloride gas which is evolved. The product is diluted with about 150 ml. of dimethylformamide and then precipitated by adding this solution to a large volume of rapidly stirred methanol. The precipitated polymer is extracted and dried. The strongly reddish-purple colored polymer can be molded into articles of desired shape and size.

Again following the same general procedure, but using a mixture of about 35.2 g. (0.1 mol.) of 4,4′-biphenyl disulfonyl chloride, 15 g. (0.095 mol.) of biphenyl and 1.33 g. (about 0.005 mol.) of thioindigo scarlet R, a red colored polymer is produced consisting of repeating units of biphenyl sulfone groups and thioindigo residues.

In the same manner, polymerization of a mixture of about 32.5 g. (0.1 mol) of 2,7-napthalene disulfonyl chloride, 15 g. (0.095 mol) of biphenyl, 18 g. of Arochlor-1248 and 2.2 g. (about 0.005 mol) of indanthrene violet RT produces a purple colored polymer.

It is apparent that the amounts of the comonomers and dye are so chosen as to be in approximately stoichiometrically correct proportions when di(sulfonyl chloride)-substituted compounds are condensed with hydrocarbons. Thus, as shown herein, any of the monomers or comonomers which are described hereinabove form polyarylsulfone polymers, can be copolymerized with dyes to produce colored polymers. By appropriate selection of the dyestuff, any desired color and intensity of color can be incorporated into the polymer.

What is claimed is:

1. A visibly colored thermoplasic polysulfone polymer consisting essentially of repeating units of the formula

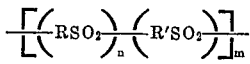

wherein R is an aromatic nucleus, R' is the divalent residue of an aromatic Zerewitinoff-active hydrogen-free dye wherein the valence bonds are attached to aromatic rings, $n$ is a number from 5 to about 500 and $m$ is a number of from 1 to about 10.

2. A polymer according to claim 1, in which R is

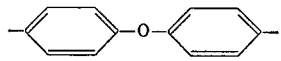

3. A polymer according to claim 1, in which R is

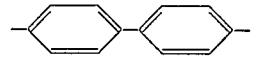

4. A polymer according to claim 1, in which R is

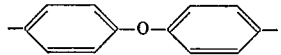

and R' is

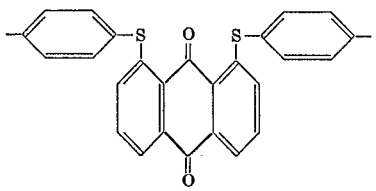

5. A polymer according to claim 1, in which R is

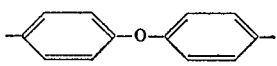

and R' is

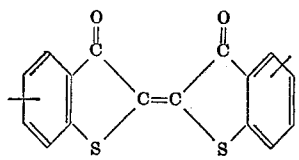

6. A polymer according to claim 1, in which R is

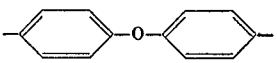

and R' is

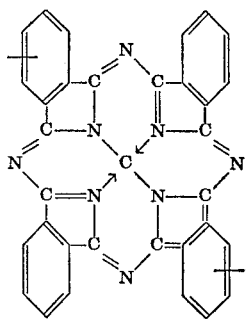

References Cited

UNITED STATES PATENTS

| | | |
|---|---|---|
| 3,278,486 | 10/1966 | Meek et al. _____ 260—79.3 |
| 3,321,449 | 5/1967 | Vogel. |
| 3,072,616 | 1/1963 | Wright et al. _____ 260—79.3 |
| 3,317,490 | 5/1967 | Dowbenko _____ 260—79.3 |
| 3,322,728 | 5/1967 | Hill et al. _____ 260—79.3 |

JOSEPH L. SCHOFER, *Primary Examiner.*

D. K. DENENBERG, *Assistant Examiner.*